(No Model.)
J. J. FAULKNER.
COTTON SEED LINTING MACHINE.
No. 457,263. Patented Aug. 4, 1891.
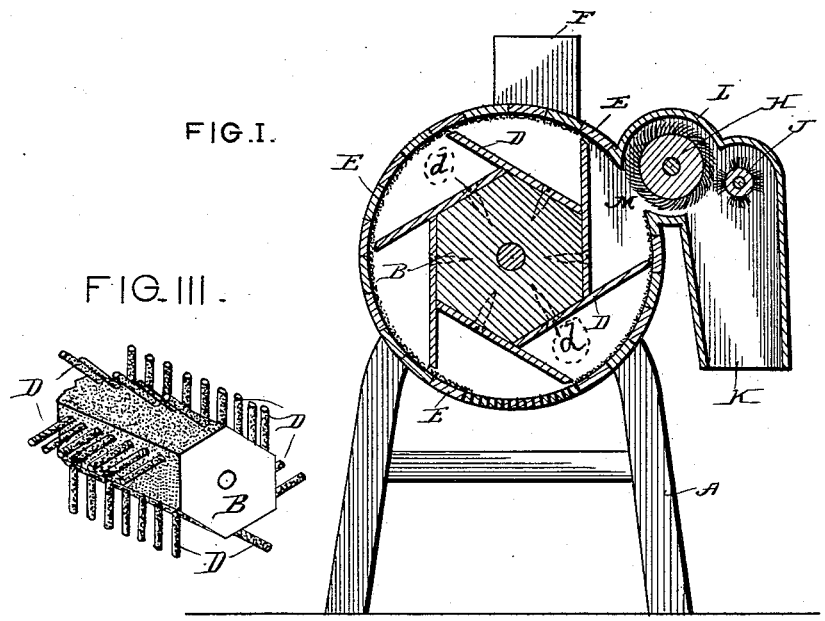
FIG. I.
FIG. III.
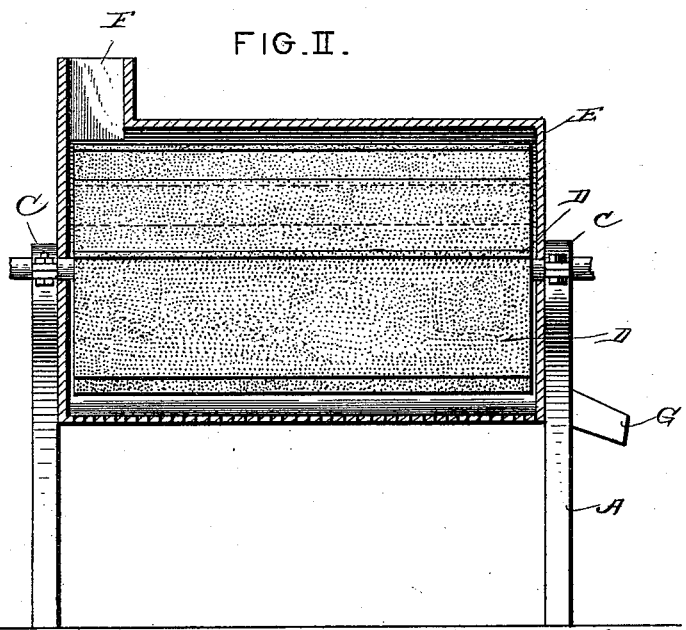
FIG. II.
Witnesses:
Harry S. Rohrer
Emma Arthur
Inventor:
James J. Faulkner
by Knight Bros.
Attorneys

UNITED STATES PATENT OFFICE.

JAMES J. FAULKNER, OF MEMPHIS, TENNESSEE, ASSIGNOR OF TWO-THIRDS TO THE NATIONAL COTTON SEED OIL AND HULLER COMPANY, OF SAME PLACE.

COTTON-SEED-LINTING MACHINE.

SPECIFICATION forming part of Letters Patent No. 457,263, dated August 4, 1891.

Application filed September 9, 1890. Serial No. 364,402. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed-Linting Machines, of which the following is a specification.

The object of my invention is to produce a machine of simple construction by which the lint or short fiber adhering to cotton-seed after passing through the gin may be effectually removed and separated from the seed.

My machine is constructed with a cylindrical casing made up of staves coated on the inside with emery, concrete, or like rough substance, and an agitator consisting of a shaft of polygonal form revolving within the casing, to the flat faces of which shaft paddles or pins are attached projecting tangentially therefrom nearly to the interior surface of the casing, the paddles or pins being also covered with emery or other material to produce a rough surface to act on the seed and lint by abrasion. I also provide a separating-cylinder provided with card-clothing or emery to take the detached lint out of the main agitator and a doffing-brush to remove the lint from the separating-cylinder and discharge it from a suitable spout, as hereinafter fully described in connection with the accompanying drawings, in which—

Figure I is an end view of the machine with the end of the casing removed. Fig. II is a vertical longitudinal section of the same. Fig. III is a perspective view of the modification of the agitator, showing it provided with agitating-pins.

A represents a suitable frame, within which is mounted the shaft B in journal boxes or bearings C. The shaft B is here shown of hexagonal form, but may be of any polygonal shape to provide flat faces, on which the pins or paddles D are secured. When the pins are used, they are simply screwed into the flat faces of the shaft, and when the paddles are employed the latter may be secured to such faces by means of bolts, screws, or nails *d*, or by any other suitable means.

E is a cylindrical casing surrounding the cylinder, preferably made up of staves, as shown, and coated on its inside surface with emery, concrete, or other suitable material to scour the seed and detach the lint therefrom. The pins or paddles D are also coated with emery or in any other suitable manner made with rough surfaces for the same purpose. The manner of securing these pins or paddles to the flat faces of the polygonal cylinder by screws or bolts *d* permits their ready removal for recoating with emery as often as needful.

F represents the feed-spout of the machine, and G the discharge-spout for the linted seed. The lint as it is detached from the seed and carried around the casing by the rotation of the pins or paddles D is caught up by a revolving cylinder H, covered with card-clothing or emery working within a casing L on one side of the main casing F, with which it communicates through a longitudinal opening M. The rotation of the paddles D produces a current of air which carries the detached lint through the opening M, where it is caught by the card-cylinder H, and from which it is discharged by the doffing-brush J, which is revolved in the opposite direction and at a higher surface velocity than the carding-cylinder H in customary manner and delivers the lint into a spout or chute K.

The machine can be made of any length desired.

Having thus described my invention, the following is what I claim as new therein and desire to secure by Letters Patent:

1. The combination of the polygonal shaft B, tangential pins or paddles D, secured to said shaft, the casing E, having a roughened interior surface, the casing L, communicating with the upper side of the casing E, and the gathering-cylinder H, arranged in casing L, substantially as set forth.

2. The combination of the polygonal shaft B, tangential pins or paddles D, projecting from the faces of said shaft, roughened cylindrical casing E, having discharge-spout G for seed and discharge-opening M for lint, gathering-cylinder H, arranged at opening M, and doffer J, contiguous to cylinder H, substantially as shown and described, for the purposes set forth.

JAMES J. FAULKNER.

Witnesses:
F. P. POSTON,
J. J. MURPHY.